United States Patent [19]

Okino et al.

[11] Patent Number: 5,151,714
[45] Date of Patent: Sep. 29, 1992

[54] COLOR IMAGE RECORDING APPARATUS

[75] Inventors: Yoshiharu Okino; Yoji Okazaki, both of Kanagawa, Japan

[73] Assignee: Fuji Photo Film Co., Ltd., Kanagawa, Japan

[21] Appl. No.: 529,404

[22] Filed: May 29, 1990

[30] Foreign Application Priority Data

May 26, 1989 [JP] Japan .................................. 1-134415

[51] Int. Cl.$^5$ .............................................. H04N 1/21
[52] U.S. Cl. .................................... 346/108; 359/197; 358/75
[58] Field of Search .................. 346/108, 107 R, 76 L, 346/160; 350/6.5, 6.7, 6.8; 358/75; 359/197, 212

[56] References Cited

U.S. PATENT DOCUMENTS 3,610,818 10/1971 Bachmann ............................ 350/173
4,848,863 7/1989 Kramer ................................ 350/3.71

Primary Examiner—Mark J. Reinhart
Attorney, Agent, or Firm—Sughrue, Mion, Zinn, Macpeak & Seas

[57] ABSTRACT

The essential feature of the color image recording apparatus of the present invention is that it uses a laser light source capable of simultaneous emission of laser beams associated with exposure to R, G and B light. The apparatus also uses a light deflector and a device for selectively reflecting or transmitting said laser beams, for example, a rotating polygonal mirror in which at least one of the reflecting faces has a different spectral characteristic of reflection than other faces or a light deflector and at least one color filter that operates in synchronism with the light deflector.

In the present invention, a laser beam having a wavelength associated with exposure to light either one or R, G and B colors is separated from the light beams emitted from the laser light source, and the recording material is exposed to successive beams of different colors, one for each scanning line, to insure exposure for a full-color image by three scanning lines. Since this obviates the need for providing the reflecting mirror and the dichroic mirrors that have been necessary to align the optical axes of R, G and B laser beams in the prior art color image recording apparatuses, it becomes possible to construct a compact and inexpensive color image recording apparatus.

10 Claims, 6 Drawing Sheets

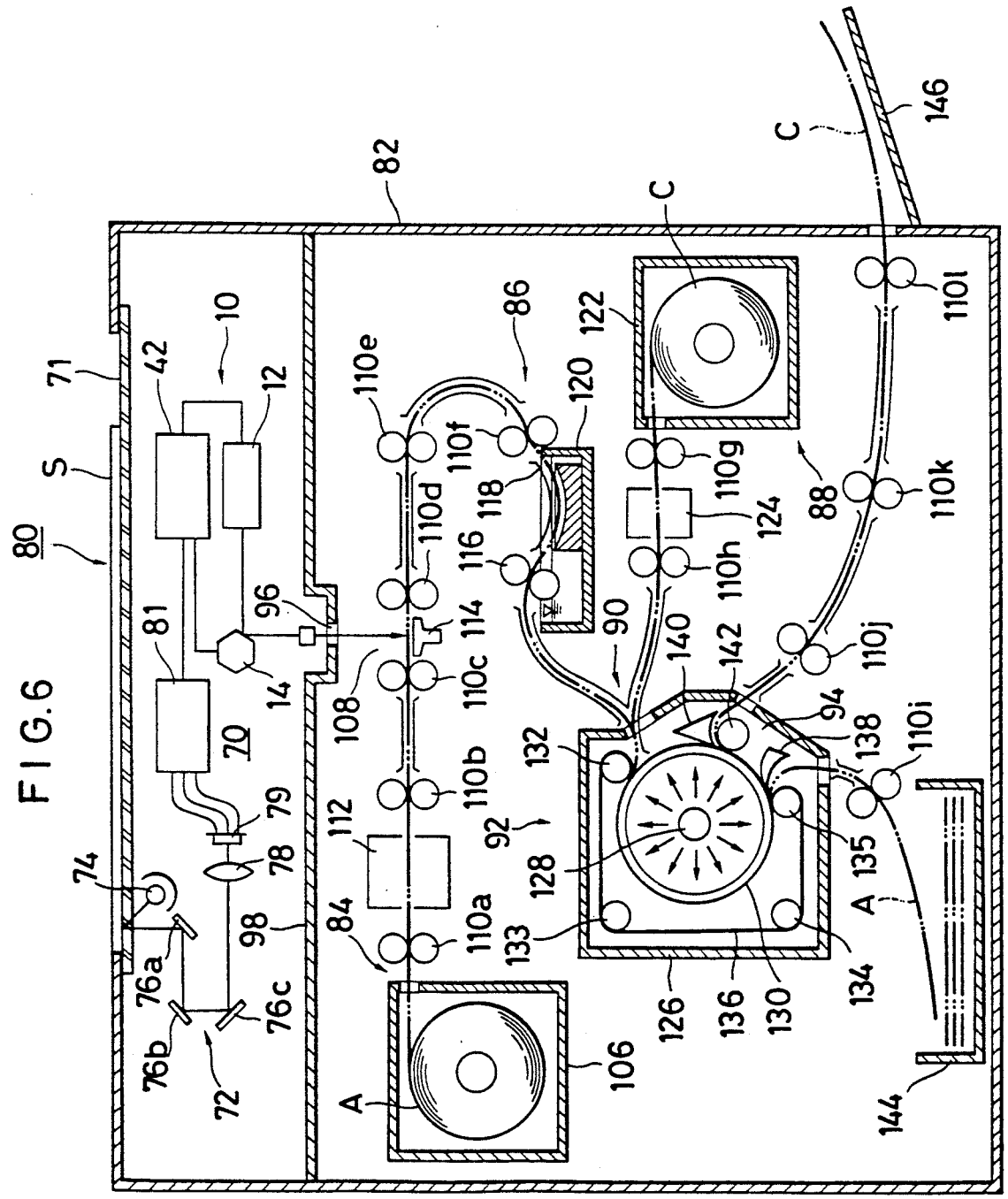

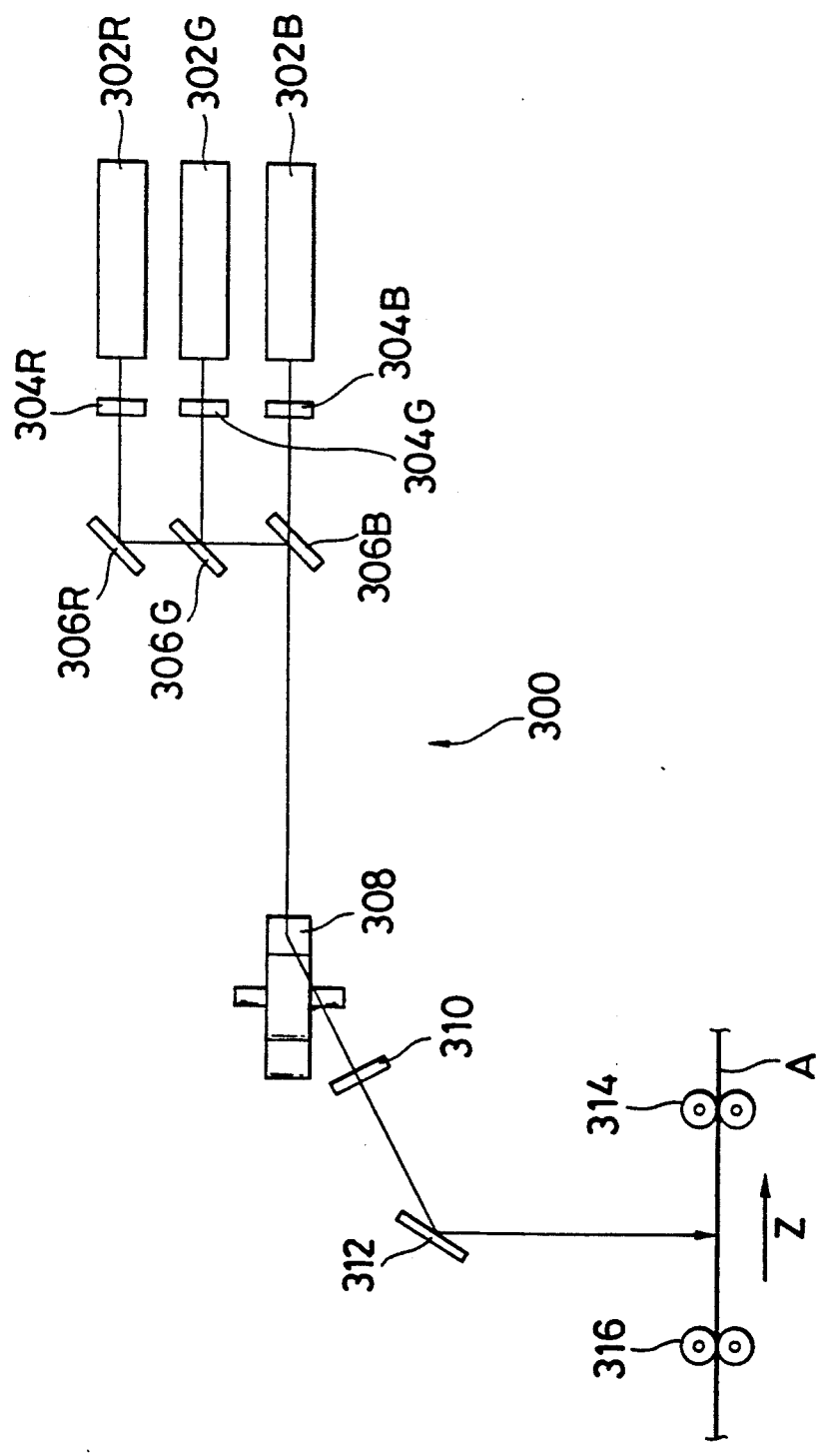

COLOR IMAGE RECORDING APPARATUS

BACKGROUND OF THE INVENTION

The present invention relates to a color image recording apparatus. More particularly, the present invention relates to an inexpensive and compact color image recording apparatus of simple configuration that employs a laser light source capable of simultaneous emission of laser beams associated with exposure to red, green and blue light.

Conventional color image recording apparatuses adopt "digital exposure" in which an digital electric signal carrying image information is converted to a light beam which is deflected to expose a light sensitive material and other various recording materials. While various techniques are available to effect "digital exposure", exposure to a laser beam finds extensive use for such advantages as uniformity and high-speed performance.

FIG. 7 is a schematic representation of a color image recording apparatus that adopts the technique of exposure to a laser beam. The color image recording apparatus generally indicated by 300 in FIG. 7 has three laser light sources 302R, 302G and 302B that are associated with exposure to red (R), green (G) and blue (B) light. The laser beams emitted from the respective light sources are shaped with associated collimator lenses 304R, 304G and 304B, then launched respectively into a reflecting mirror 306R and dichroic mirrors 306G and 306B, from which they are reflected and have their optical axes aligned with one another to form a single beam.

The Resulting single laser beam is launched into a light deflector such as a polygonal mirror 308 to be reflected and deflected in the main scanning direction. The deflected beam passes through an fθ lens 310 and is bent down by means of a cylindrical mirror 312 to be focused for scanning and exposure of a recording material A that is being transported with two roller pairs 314 and 316 in the sub-scanning direction indicated by arrow Z which is generally perpendicular to the main scanning direction.

As described above, the color image recording apparatus 300 employs three laser light sources that emit at wavelengths associated with exposure to R, G and B light, with the optical axes of the issuing laser beams being brought into alignment with one another to produce a single laser beam that scans for exposing the recording material A being transported in the sub-scanning direction. In order to align the optical axes of the respective beams from the three laser light sources, not only the reflecting mirror 306R but also the dichroic mirrors 306G and 306B are necessary and this causes the disadvantage of increasing the size and cost of the apparatus 300. Further, the need for bringing the optical axes of the three laser beams into accurate alignment with one another introduces difficulty in adjusting the optical system.

Instead of aligning the optical axes of the respective laser beams associated with exposure to R, G and B light, the exit angles of these laser beams may be so adjusted that they fall at substantially the same point on the recording material A. Various apparatuses have been proposed for recording images by this principle. These apparatuses have the advantage of obviating the need for providing dichroic mirrors and other members to bring the optical axes of three laser beams into alignment, but on the other hand, the laser beams fall at different positions on the light deflector such as a polygonal mirror, with consequent increase in the size and cost of the latter. Further, great difficulty is involved in adjusting the laser beams to fall at the same position on the recording material A.

In either type of the image recording apparatus described above, semiconductor lasers or gas lasers are commonly used as the laser light sources. Gas lasers are not only expensive but also large in size, so they have the disadvantage of increasing the size and cost of the recording apparatus itself. On the other hand, semiconductor lasers are compact and inexpensive but none of the semiconductor lasers available today are capable of emitting laser light at wavelengths in the visible range that are associated with exposure to G and B light. Thus, common recording materials having a spectral sensitivity in the visible range are not usable with semiconductor lasers and instead, special recording materials having a spectral sensitivity in the infrared region must be employed. If one wants to use common recording materials having a spectral sensitivity in the visible range, laser beams must be modulated with a special wavelength converting device such as a second harmonic generator (SHG) but then, the resulting increase in the number of components renders the recording apparatus not only expensive but also bulky.

Japanese Laid-open Patent Application No. 279314/1987 describes a recording apparatus that uses a white light emitting laser, with the emitted laser beams being modulated with an accoustooptical modulator (AOM) at the wavelengths that are associated with exposure to R, G and B light. However, the AOM used in this apparatus is quite expensive and a complex, drive circuit is necessary to control the wavelength-associated modulation with the AOM. As a result, the recording apparatus proposed by said patent application has the disadvantage that it involves both complicated control and high cost.

SUMMARY OF THE INVENTION

An object, therefore, of the present invention is to solve the aforementioned problems of the prior art by providing an inexpensive and compact color image recording apparatus of simple configuration that employs a laser light source capable of simultaneous emission of laser beams associated with exposure to R, G and B light. Preferably, an RGB laser which emits three primary color laser beams by wavelength conversion is used as said laser light source and this eliminates the need for using a special wavelength converting device such as SHG. The color image recording apparatus of the present invention has the added advantage that it is usable with common recording materials having a spectral sensitivity in the visible wavelength range.

According to the present invention, the object described above is attained by a color image recording apparatus for recording a fullcolor image by sequentially defining different scanning lines respectively corresponding to three primary colors on a material to be recorded by means of a laser beam deflected in scanning direction, wherein the apparatus is provided with a laser light source capable of simultaneous emission laser beams associated with exposure to red, green and blue light, a light deflector of said laser beams, and means for selectively reflecting or transmitting said laser beams, which changes the spectral characteristics of reflection or transmission of said laser beams at a predetermined cycle corresponding to the cycle of sequential defining of the scanning lines corresponding to the three primary colors in order to choose the color to be recorded on the material.

In a preferred embodiment of the present invention, said light deflector is a rotating polygonal mirror having a plurality of reflecting faces wherein at least one of the reflecting faces has spectral characteristics different from other reflecting faces, and said means for selectively reflecting the laser beam is the reflecting face of the rotating polygonal mirror.

In another preferred embodiment of the present invention, said reflecting face having spectral characteristics different from other reflecting faces has a different spectral reflectance for one of said three primary colors from the other two primary colors.

In still another preferred embodiment of the present invention, said means for selectively transmitting the laser beam is a color filter assembly which moves in synchronization with said light deflector, said color filter assembly having a plurality of transmitting faces wherein at least one of the transmitting faces has transmitting characteristics different from the other transmitting faces.

In yet another preferred embodiment of the present invention, said transmitting face, having transmitting characteristics different from the other transmitting faces has a different transmittance for one of said three primary colors from the other two primary colors.

In a further preferred embodiment of the present invention, said laser light source is an RGB laser which emits three primary color laser beams by wavelength conversion.

In still further preferred embodiment of the present invention, said light deflector is a rotating polygonal mirror and said color filter assembly is a color filter ring.

In yet further preferred embodiment of the present invention, said color filter assembly is a color filter disk.

BRIEF DESCRIPTION OF THE DRAWINGS

FIG. 6 is a schematic diagram of a copier incorporating the color image recording apparatus shown in FIG. 1; and FIG. 7 is a schematic diagram of a prior art color image recording apparatus.

DETAILED DESCRIPTION OF THE INVENTION

Figure 1:
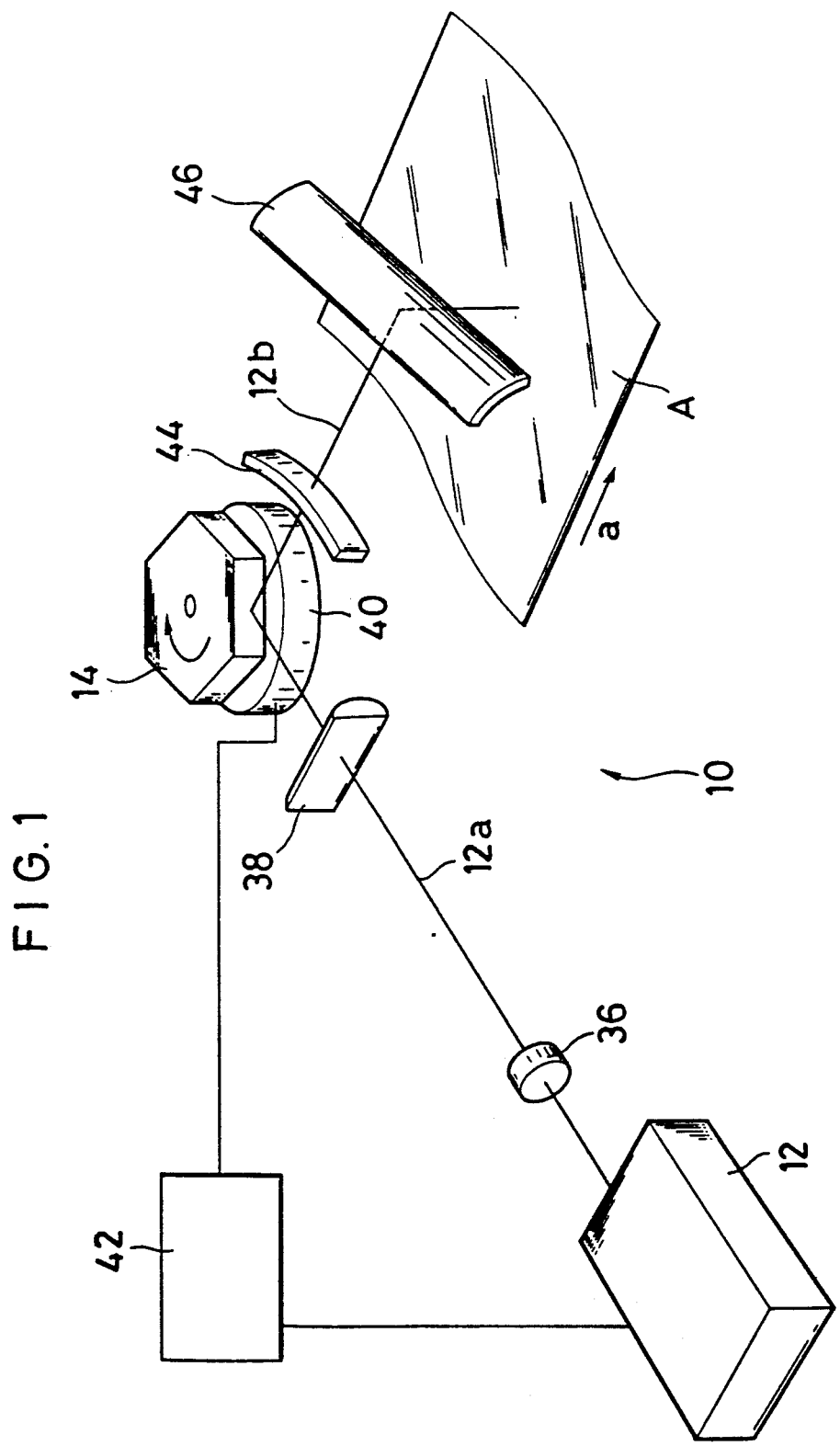
FIG. 1 is a schematic diagram of a color image recording apparatus according to the first embodiment of the present invention.

One essential feature of the color image recording apparatus of the present invention is that it uses a laser light source capable of simultaneous emission of laser beams associated with exposure to R, G and B light. According to the present invention, said apparatus uses a light deflector and means for selectively reflecting or transmitting said laser beams.

In the present invention, a rotating polygonal mirror, a galvanometer mirror, a resonantscanner and the like can be used as the light deflector. As means for selectively reflecting or transmitting said laser beams, which changes the spectral characteristics of reflection or transmission of said laser beams at a predetermined cycle corresponding to the cycle of sequential defining of the scanning lines corresponding to the three primary colors in order to choose the color to be recorded on the material, at least one of the reflecting faces of the rotating polygonal mirror having spectral characteristics different from other reflecting faces and a color fileter assembly which moves synchronization with the light diflector, and which has a plurality of transmitting faces wherein at least one of the transmitting faces has transmitting characteristics different from other transmitting faces can be used. The reflecting or transmitting face having spectral characteristics different from other reflecting or transmitting faces has a different spectral reflectance or transmittance for one of the three primary colors from the other two primary colors, respectively. The color filter assembly to be used in the present invention includes a color filter ring, a color filter disk and the like.

The apparatus of the first embodiment of the present invention also uses a rotating polygonal mirror in which at least one of the reflecting faces has a different spectral characteristic of reflection than other faces. The apparatus of the second embodiment also uses a rotating polygonal mirror and a color filter ring that rotates in synchronism with said polygonal mirror as a color filter assembly. The apparatus of the third embodiment also uses a light deflector and a color filter disk that operates in synchronism with the light deflector as a color filter assembly.

In either embodiment of the present invention, a laser beam having a wavelength associated with exposure to light either one of R, G and B colors is separated from the light beams emitted from the laser light source, and the recording material is exposed to successive beams of different colors, one for each scanning line, to insure exposure for a full-color image by three scanning lines. Since this obviates the need for providing the reflecting mirror and the dichroic mirrors that have been necessary to align the optical axes of R, G and B laser beams in the prior art color image recording apparatuses, it becomes possible to construct a compact and inexpensive color image recording apparatus. Further, the use of a single laser light source offers the advantage of facilitating not only the procedure of adjusting the optical axes of laser beams associated with exposure to R, G and B light which is necessary in the conventional color image recording apparatus but also the procedure of adjusting other optical elements. Another advantage of the present invention is that despite the use of a laser light source capable of simultaneous emission of laser beams associated with exposure to R, G and B light, a control circuit and other complex devices are unnecessary and color image recording can be achieved with a simple configuration by simple procedures of control.

The color image recording apparatus of the present invention is described below in detail with reference to the preferred embodiments shown in accompanying FIGS. 1-6.

FIG. 1 shows schematically a preferred embodiment of the color image recording apparatus according to the first embodiment of the present invention. The color image recording apparatus generally indicated by 10 uses an RGB laser 12 capable of simultaneous emission and wavelength conversion of laser beams of three primary colors, i.e. a laser beam at 650 nm associated with exposure to red (R) light, a beam at 532 nm associated with exposure to green (G) light, and a beam at 450 nm associated with exposure to blue (B) light. Such a laser is hereunder referred to simply as an "RGB laser". A laser beam 12a emitted from the RGB laser 12 is deflected by a rotating polygonal mirror 14 in the direction of main scanning and performs two-dimensional scanning and exposure of a recording material A that is being transported in the sub-scanning direction indicated by arrow a. The polygonal mirror 14 is in hexagonal form as shown in FIG. 1 such that the respective reflecting faces have different spectral characteristics of reflection in accordance with the wavelength of incident laser beam. To state more specifically, the reflecting faces of the polygonal mirror 14 have different reflectances that relate to the wavelengths of laser beams associated with the exposure to R, G and B light, and one reflecting face associated with light of one color has a higher reflectance than the other faces associated with light of the two other colors, so that the former will selectively reflect a one-color component of the laser beam 12a which is a mixture of the laser beams having wavelengths associated with exposure to R, G and B light.

Figure 2:
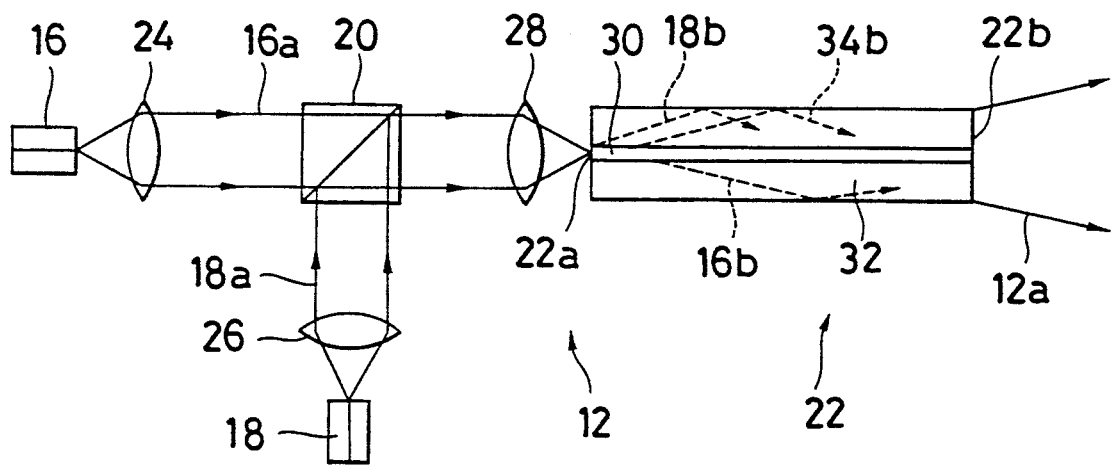
FIG. 2 is a schematic diagram of an example of the RGB laser that is capable of simultaneous emission and wavelength conversion of laser beams of three primary colors and that may be used with the color image recording apparatus shown in FIG. 1.

FIG. 2 shows schematically an example of the RGB laser 12. The RGB laser 12 shown in FIG. 2 comprises basically the following components: a first semiconductor laser 16 that emits a laser beam 16a at 1,300 nm as a first fundamental wave; a second semiconductor laser 18 that emits a laser beam 18a at 900 nm as second fundamental wave; a beam splitter 20 by which the optical axis of the laser beam 16a is brought into alignment with the axis of the laser beam 18a; and wavelength converting device 22 that synthesizes and converts the wavelengths of the two aligned laser beams to form a laser beam 12a which is a mixture of the laser beams having wavelengths associated with exposure to R (650 nm), G (532 nm) and B (450 nm) light.

The laser beam 16a issuing from the first semiconductor laser 16 is collimated by a collimator lens 24 and launched into the beam splitter 20. The laser beam 18a issuing from the second semiconductor laser 18 is collimated by another collimator lens 26 and launched into the beam splitter 20. The laser beams 16a and 18a launched into the beam splitter 20 have their optical axes aligned with each other to form a single laser beam, which is launched into a condenser lens 28, with the resulting convergent beam being launched into the wavelength converting device 22 at one end face 22a.

The wavelength converting device 22 is basically an optical fiber that has core 30 embedded in a cladding 32 having a lower refractive index. The core 30 is formed of the single crystal of a non-linear material such as 3,5-dimethyl-1-(4-nitrophenyl)pyrazole or 3,5-dimethyl-1-(4-nitrophenyl)-1,2,4-triazole, and the directions of its crystallographic orientation are so set that the c-axis will extend along the length of the core 30. The cladding 32 is formed of an amorphous material selected from among various optical glasses such as SF8 glass and SF15 glass.

When the mixture of the laser beam 16a at 1,300 nm and the laser beam 18a at 900 nm is launched into the core 30 through the end face 22a, the non-linear material of which the core 30 is formed modulates the incident beam in such a way that the laser beam 16a in converted to a second harmonic 16b at 650 nm, the laser beam 18a to another second harmonic 18b at 450 nm, with both 16a and 18a being converted to a wave 34b of the sum frequency 532 nm. As a result, a single laser beam 12a emerges from the other end face 22b of the wavelength converting device 22 and this beam is a mixture of three laser beams, one having a wavelength of 650 nm associated with exposure to R light, another having a wavelength of 532 nm associated with exposure to G light, and the last one having a wavelength of 450 nm associated with exposure to B light.

While the RGB laser 12 is shown in FIG. 2 to emit the single laser beam 12a that consists of three laser beams at wavelengths associated with exposure to R, G and B light, it should be noted that said RGB laser is capable of emitting only the laser beam at 650 nm associated with exposure to R light if the first semiconductor laser 16 is selectively operated, and emitting only the laser beam at 450 nm associated with exposure to B light if the second semiconductor laser 18 is selectively operated. For further details of the RGB laser 12, reference may be has to commonly assigned Japanese Laid-open Patent Application No. 244,433/1989.

The RGB laser 12 preferably used in the color image recording apparatus 10 of the present invention adopts semiconductor lasers as emission sources of fundamental waves and this contributes to reduction in the size and cost of the overall equipment. Further, in spite of the adoption of semiconductor lasers, the apparatus can be used with common recording materials having a spectral sensitivity in the visible wavelength range even if no wavelength converting device such as SHG is used.

The laser light source that can be used in the image recording apparatus of the present invention is in no way limited to the RGB laser 12 described above, and a variety of known lasers such as a He-Cd white light emitting laser may also be used as long as they are capable of simultaneous emission of laser beams associated with exposure to R, G and B light.

The laser beam 12a issuing from the RGB laser 12 is collimated by a collimator lens 36, then compensated for tilting by passage through a cylindrical lens 38, and thereafter falls at a reflecting face of the polygonal mirror 14 so that it is deflected and reflected one-dimensionally in the direction of main scanning. In the color image recording apparatus shown in FIG. 1, the polygonal mirror 14 is so designed that its reflecting faces have different reflectances in accordance with the wavelength of incident laser beam. Thus, one reflecting face of the polygonal mirror 14 is adapted to selectively reflect a one-color component of the laser beam 12a which is composed of three laser beams associated with exposure to R, G and B light.

Figure 3:
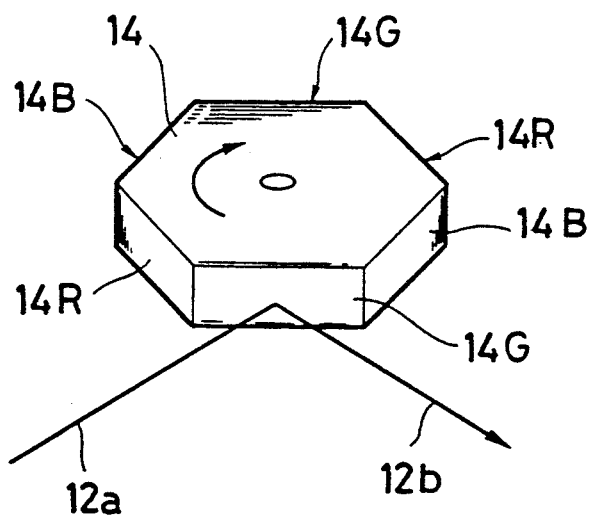
FIG. 3 is schematic diagram of a polygonal mirror that is used with the color image recording apparatus shown in FIG. 1.

FIG. 3 is a schematic diagram of the polygonal mirror 14. As already described, the polygonal mirror 14 has different reflectances at adjacent reflecting faces. Reflecting faces 14R have a higher reflectance of the laser beam at 650 nm associated with exposure to R light and will cause little reflection of laser beams at other wavelengths. Similarly, reflecting faces 14G have a higher reflectance of the laser beam at 532 nm associated with exposure to G light and will cause little reflection of laser beams at other wavelengths. Reflecting faces 14B have a higher reflectance of the laser beam at 450 nm associated with exposure to B light and will cause little reflection of laser beams at other wavelengths. Because of this arrangement, the following phenomenon occurs when the laser beam 12a falls on a certain reflecting face of the polygonal mirror 14: the laser beam the reflectance of which is higher at that face than other reflecting faces is selectively reflected (in the example shown, the laser beam at 532 nm associated with exposure to G light), and the resulting laser beam 12b which has a wavelength associated with exposure to light of either one of R, G and B colors (in the example shown, G light) will travel to the next component. Hence, the color image recording apparatus 10 of the present invention performs exposure to light of one color by one scanning line and completes exposure to light of three colors by three scanning lines (corresponding to a 180° rotation of the polygonal mirror 14).

The wavelength-associated difference in reflectance between adjacent reflecting faces of the polygonal mirror 14 may be determined in accordance with the spectral sensitivity characteristic of the recording material to be used in such a way that it will not be fogged during exposure. Thus, the sharper the spectral sensitivity characteristic of the recording material A, the smaller the difference in reflectance between adjacent reflecting faces may be.

Reflecting faces that have different reflectances in accordance with the wavelength of incident laser beam can be formed by various known methods, an example of which consists of forming reflecting faces by evaporation of a metal, with their reflectances being differentiated by adjusting the thickness of deposited films.

According to the first embodiment of the present invention, the polygonal mirror 14 is so designed that at least one of its reflecting faces has different spectral characteristic of reflection than other faces. In the embodiment described above, this is accomplished by rendering the reflecting faces of the polygonal mirror 14 to have different reflectances in accordance with the wavelength of incident laser beam. Other methods may of course by employed and according to one example, filters associated with R, G and B light are provided for the individual reflecting faces in such a way that one of them will reflect only one wavelength-component of the laser beam 12a that is associated with exposure to light of either one of R, G and B colors. According to another example, a 100% reflecting face is additionally provided for the polygonal mirror 14. In this case, the polygonal mirror has reflecting faces the number of which is equal to an integral multiple of the number of R, G, B and 100% reflecting faces, and it provides reflecting faces solely intended for exposure to gray light.

As already mentioned, the RGB laser 12 is such that it is capable of emitting only the laser beam at 650 nm associated with exposure to R light if the first semiconductor laser 16 is selectively operated, and emitting only the laser beam at 450 nm associated with exposure to B light if the second semiconductor laser 18 is selectively operated. Hence, it is also within the scope of the present invention that all of the reflecting faces but 14G of the polygonal mirror 14 are used as ordinary 100% reflecting faces and that the wavelength of the laser beam from the RGB laser 12 is successively changed in three stages to, for example, 650 nm, the mixture of three wavelengths and 450 nm, with the laser beam having the mixture of three wavelengths being adjusted to fall on the reflecting faces 14G. By these procedures, exposure to light of one color is performed by one scanning line and exposure to light of three colors R, G and B can be completed by three scanning lines.

A rotation sync signal generator 40 (see FIG. 1) such as an encoder is connected to the motor of the polygonal mirror 14, and this sync signal generator 40 is connected to modulator circuit 42 which in turn is connected to the RGB laser 12.

As described above, the color image recording apparatus 10 of the present invention performs exposure to light of either one of three colors R, G and B by one scanning line and completes two cycles of exposure to R, G and B light when the polygonal mirror 14 turns fully once. Therefore, the RGB laser 12 must also be driven in synchronism with the exposure by each scanning line, namely, in association with the reflecting faces of the polygonal mirror 14. To this end, the modulator circuit 42 detects the rotation of the polygonal mirror 14 in response to a signal generated by the rotation sync signal generator 40 (say, one pulse per rotation of the polygonal mirror) and performs the necessary control over the issuance of laser beam 12a from the RGB laser 12.

The laser beam 12b that has been reflected and deflected by the polygonal mirror 14 in the direction of main scanning and that is associated with exposure to light of either one of three colors R, G and B passes through an $f\theta$ lens 44 and is bent down by means of a cylindrical mirror 46 to be focused for scanning and exposure of the recording material A which is being transported in the subscanning direction indicated by arrow a.

Subsequently, color image recording apparatuses according to other embodiments of the present invention are described below. These apparatuses use a light deflector and at least one color filter instead of a rotating polygonal mirror, in which at least one of the reflecting faces has a different spectral characteristic of reflection than other faces according to the first embodiment.

The second embodiment of the present invention is described below. The color image recording apparatus according to the second embodiment of the present invention comprises the RGB laser 12 already described above, a rotating polygonal mirror and a color filter ring that rotates in synchronism with this polygonal mirror as a color filter assembly. This apparatus is the same as the color image recording apparatus 10 according to the first embodiment of the present invention except for the polygonal mirror and the color filter assembly. Thus, the following description of the second embodiment of the present invention is limited to these characteristic components.

Figure 4:
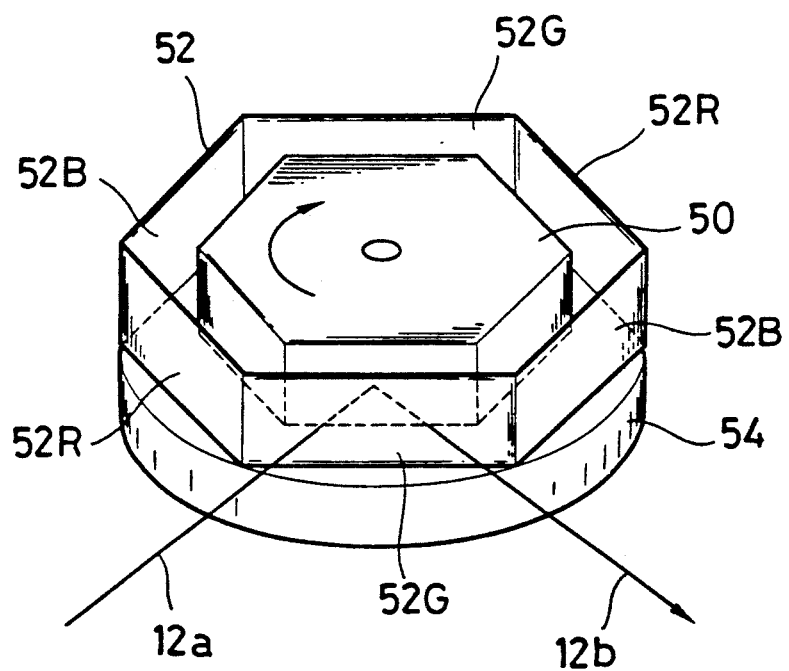
FIG. 4 is a schematic diagram of a polygonal mirror and a color filter ring that are used in a color image recording apparatus according to the second embodiment of the present invention.

FIG. 4 shows schematically the polygonal mirror and the color filter ring that are used in the color image recording apparatus according to the second embodiment of the present invention. As shown, the color filter ring generally indicated by 52 is in a hexagonal tubular form when the polygonal mirror 50 is in a hexagonal form. The six sides through which a laser beam will pass have two red filters 52R, two green filters 52G and two blue filters 52B. The polygonal mirror generally indicated by 50 is placed within the color filter ring 52 on a support 54 in such a way that they have a common central axis and that the individual reflecting faces of the polygonal mirror 50 coincide with the surfaces of the respective color filters on the ring 52. When the support 54 is rotated by a drive source (not shown), the polygonal mirror 50 will rotate in synchronism with the color filter ring 52.

Because of the arrangement described above, the laser beam 12a that is emitted from the RGB laser 12 and which is a mixture of the laser beams at wavelengths associated with exposure to light of three colors R, G and B passes through one color filter on the filter ring 52 to form a laser beam 12b which is associated with the exposure to light of either one of the three colors R, G and B. This laser beam 12b is reflected from a reflecting face of the polygonal mirror 50 and passes again the same color filter on the filter ring 52. Thus, as in the color image recording apparatus 10 according to the first embodiment of the present invention, the recording material A being transported in the sub-scanning direction is scanned and exposed to light of one color by a single scanning line, with exposure to light of three colors R, G and B being completed by three scanning lines (i.e., a 180° rotation of the polygonal mirror 50).

Color filters that can be used in the color filter ring 52 are not limited to any particular type and every kind of color filters that are applied to common image recording apparatuses may be employed. In the example shown in FIG. 4, the color filter ring 52 and the polygonal mirror 50 are placed on the support 54 and they are allowed to rotate synchronously by the rotation of the support 54. It should however be noted that the present invention is not limited to this particular embodiment and that any drive method may be employed as long as the color filter ring 52 and the polygonal mirror 50 are capable of synchronous rotation.

Again, as in the first embodiment of the present invention, the color filter ring and the polygonal mirror may be so constructed as to satisfy the condition that the number of reflecting faces be equal to an integral multiple of the number of R, G, B and 100% reflecting faces. Alternatively, the wavelength of the laser beam issuing from the RGB laser 12 may be successively changed in three stages to, for example, 650 nm, the mixture of three wavelengths and 450 nm, with a color filter being provided on only the faces that are associated with exposure to G light.

Figure 5:
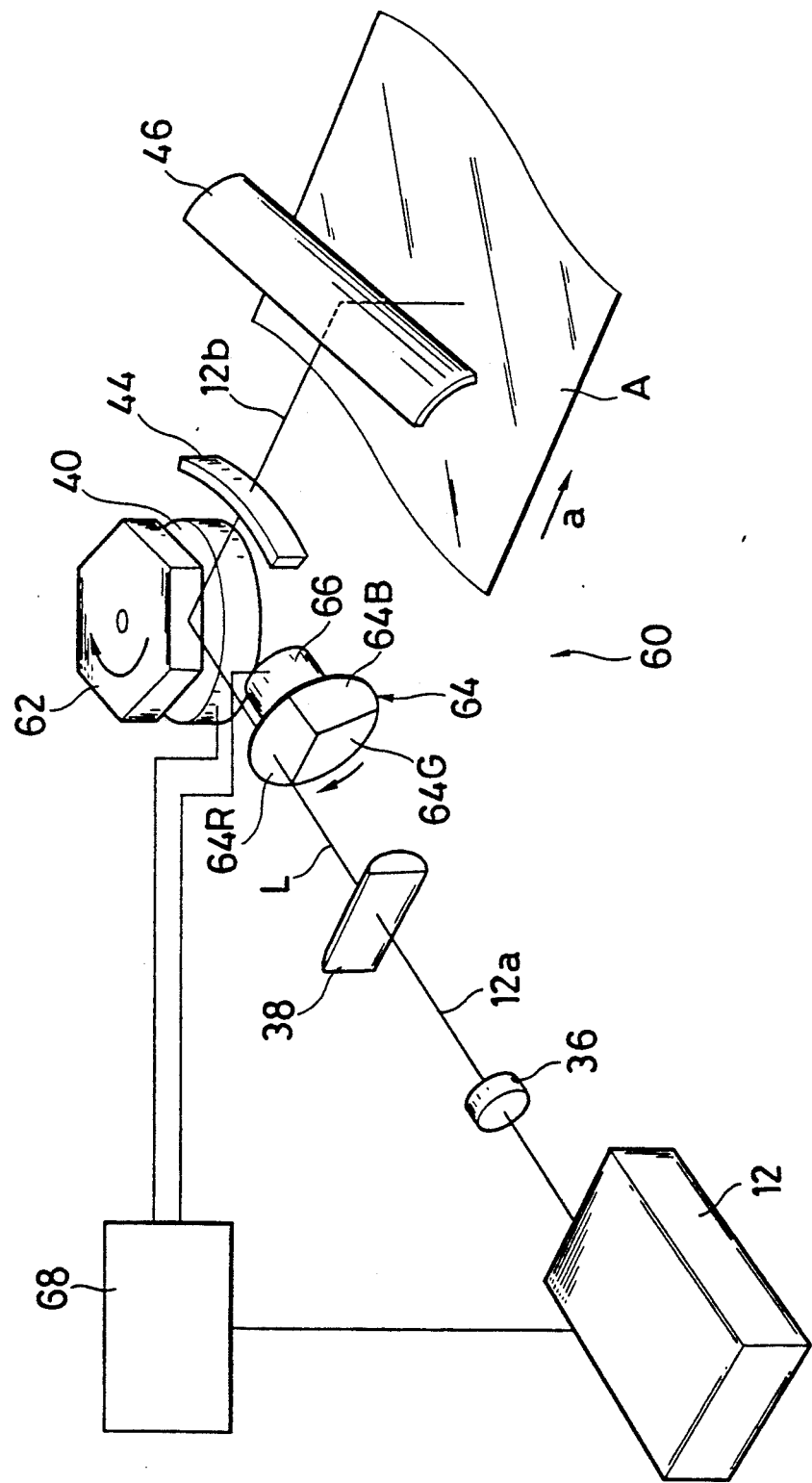
FIG. 5 is a schematic diagram of a color image recording apparatus according to the third embodiment of the present invention.

FIG. 5 shows an example of the color image recording apparatus according to the third embodiment of the present invention. The color image recording apparatus generally indicated by 60 in FIG. 5 has basically the same configuration as the color image recording apparatus 10 according to the first embodiment of the present invention, and the laser beam 12a that is emitted from the RGB laser 12 capable of simultaneous emission of laser beams associated with exposure to R, G and B light is deflected by a light deflector such as a polygonal mirror 62 in the direction of main scanning, so that the recording material A being transported in the sub-scanning direction indicated by arrow a will be scanned and exposed two-dimensionally.

The RGB laser 12, collimator lens 36, cylindrical lens 38, rotation sync signal generator 40, fθ lens 44 and cylindrical mirror 46 i the color image recording apparatus 60 shown in FIG. 5 are the same as those used in the color image recording apparatus 10, so they are identified by like numerals and will not be described in detail.

The color image recording apparatus 60 according to the third embodiment of the present invention has a color filter disk 64 as the color filter assembly that operates in synchronism with the polygonal mirror 62 in hexagonal form. In the example shown, this color filter disk 64 is provided in the optical path L of laser beam 12a between the cylindrical lens 38 and the polygonal mirror 62.

The color filter disk 64 is a member in disk shape that is divided into three equal portions by a red filter 64R, a green filter 64G and a blue filter 64B. this filter disk as color filter assembly is driven by a drive source 66 to rotate in the direction indicated by the arrow in synchronism with the polygonal mirror 62, so that the filters will be inserted successively into the optical path L in association with the individual reflecting faces of the polygonal mirror 62.

By this arrangement, the laser beam 12a that is emitted from the RGB laser 12 and which is a mixture of the laser beams at wavelengths associated with exposure to light of three colors R, G and B passes through one color filter in the filter disk 64 to form a laser beam 12b which is associated with the exposure to light of either one of the three colors 4, G and B. This laser beam 12b is deflected and reflected by a reflecting face of the polygonal mirror 62 in the direction of main scanning and, as in the color image recording apparatus 10 according to the first embodiment of the present invention, the recording material A being transported in the sub-scanning direction is scanned and exposed to light of one color by single scanning line, with exposure to light of three colors R, G and B being completed by three scanning lines. Thus, in the case under consideration, the color filter disk 64 is controlled in such a way that it makes two revolutions each time the polygonal mirror 62 turns fully once.

As described above, the laser beam from the RGB laser 12 is transmitted through the color filter disk 64 so as to form a laser beam associated with exposure to light of either one of three colors R, G and B, and this laser beam is allowed to fall on one reflecting face of the polygonal mirror 62, by which it is reflected and deflected in the direction of main scanning to expose the recording material A to light of one color by a single scanning line. Thus, in the color image recording apparatus 60, the color filter disk 64 and the polygonal mirror 62 must rotate (operate) synchronously. To this end, not only the polygonal mirror 62 but also the drive source 66 for the filter disk 64 is provided with a rotation sync signal generator which is connected to a modulator circuit 68. In response to the signals generated from the rotation sync signal generator 40 and the rotation sync signal generator provided for the drive source 66, the modulator circuit 68 detects the rotation of the polygonal mirror 62 and the color filter disk 64 and controls them in such a way that they are rotated synchronously. Further, as in the color image recording apparatus 10 according to the first embodiment of the present invention, the modulator circuit 68 controls, in response to the rotation of the color filter disk 64 and the polygonal mirror 62, the emission of laser beam 12a from the RGB laser 12 in proportion to the amount of exposure to R, G or B light.

In the example shown in FIG. 5, polygonal mirror 62 is used as a light deflector but the present invention is in no way limited thereto and various other light deflectors including a galvanometer mirror and resonant scanner may be used. In the example shown, the color filter disk 64 is in disk form and the respective filters are successively inserted into the optical path L by rotating this filter assembly in synchronism with the polygonal mirror 62. However, the present invention is in no way limited to this particular embodiment and various other color filter assemblies that operate in synchronism with the polygonal mirror 62 to insure successive insertion of filters into the optical path L may be used. For instance, a rectangular color filter assembly having a red, a green and a blue filter may be allowed to reciprocate in synchronism with the rotation of the polygonal mirror 62 so that the filters are successively inserted into the optical path L.

The position of the color filter disk 64 is also not limited to the one shown in FIG. 5 and it may be located in any position on the optical path L. Needless to say, the color filter disk 64 is preferably located closer to the RGB laser 12 than the light deflector 62 so that said filter assembly with not become bulky. It also goes without saying that as in the first embodiment of the present invention, the color filter disk 64 and the light diflector 62 may be so configured to as effect exposure to light of R, G, B and gray colors. Alternatively, the wavelength of the laser beam emitted from the RGB laser 12 may be successively changed in three stages to, say, 650 nm, the mixture of three wavelengths and 450 nm, with a color filter being provided on only the reflecting faces associated with exposure to G light.

In order to insure that any color mismatch in the scanning lines for the three colors R, G and B will become less marked, it would be effective for the image recording apparatus of the present invention to perform high density scanning that is an integral multiple of an image modulation unit, i.e., 400 lines per inch for each color.

FIG. 6 shows schematically a copier that incorporates the color image recording apparatus 10 according to the first embodiment of the present invention and which uses a recording material A that has a light-sensitive layer, which requires a thermal development step and which forms a transfer image on a receiving material having an image receiving layer in the presence of an image forming solvent such as water.

The copier which is generally indicated by 80 comprises a housing 82 that contains: a recording material supply unit 84 accommodating the recording material A; an image exposure unit 70 that reads the image information on a document (original) S, that performs image processing on the information read, and that exposes the recording material A to form a latent image; and an image forming unit that comprises a water applying section 86 in which water is applied onto the recording material A, a receiving sheet supply section 88 accommodating receiving sheet C, a superimposing section 90 in which the recording material A is superimposing on the receiving sheet C, a thermal development/transfer section, 92 in which the recording material A superimposed on the receiving sheet C is heated to transfer the developed image onto the receiving sheet C, and a detacking section 94 for separating the receiving sheet C from the recording material A.

The document S is placed on a transparent platen 71 on top of the housing 82 and the image exposure unit 70 is provided below the platen 71. The image exposure unit 70 is composed of a reading mechanism 72 and the color image recording apparatus 10 according to the first embodiment of the present invention. The reading mechanism 72 is comprised of a light source 74 movable beneath the platen 71 in the scanning direction, a mirror 76a moving together with the light source 74, mirrors 76b and 76c that move in the same direction as the light source 74 but at one half the speed of its movement, an imaging lens 78, a CCD (charge coupled device image sensor) sensor 79 and a control circuit 81. The control circuit 81 is connected to the modulator circuit 42 in the color image recording apparatus 10. The construction of the color image recording apparatus 10 is identical to that shown in FIG. 1 and need not be described in detail.

In the copier 80 shown in FIG. 6, the light source 74 scans and illuminates the underside of the document S. The light reflected from the document S is further reflected by mirrors 76a, 76b and 76c, focused by imaging lens 78 and launched into the CCD sensor 79, where the color-separated light is subjected to photoelectric conversion, with the resulting data being transferred to the control circuit 81. In response to the data transferred, the control circuit 81 determines the condition for emission from the RGB laser 12 and send a relevant signal to the modulator circuit 42.

The image exposure unit 70 is optically isolated from the other parts of the copier by partition 98 except in an aperture 96 through which the optical axis of exposing light will pass. The recording material supply unit 84 is loaded with a detachable magazine 106 accommodating a roll of recording material A. The supply unit 84 also has roller pairs 110a–110d that transport the recording material A from the magazine 106 to an exposure position 108. A cutter 112 for cutting the recording material A to predetermined length is provided between roller pairs 110a and 110b. An exposure table 114 is provided between roller pairs 110c and 110d in a position just beneath the aperture 96 made in the partition 98. A transport path composed of a roller pair 110e and a guide plate is provided ahead of the exposure position 108 (the term "ahead of" as used hereinafter means "downstream in the direction in which the light-sensitive material and other forms of the recording material A travel"). The recording material A in the exposure position 108 is subjected to imagewise exposure to form a latent image and is thereafter transported to the water applying section 86 via the transport path composed of roller pair 110e and the guide plate.

The water applying section 86 serves to facilitate the transfer of the latent image on the recording material A and comprises a water tank 120 filled with water, a guide plate 118 for guiding the recording material A into the water, a roller pair 110f that transports the recording material A along the guide plate 118, and a squeeze roller pair 116 that scrapes excess water off the recording material A that has swollen by absorbing water. The recording material A to which water has been applied is transported to the superimposing section 90 by the squeeze roller pair 116.

The receiving sheet supply section 88 for supplying the receiving sheet C is provided in the right-hand portion of the housing 82. The receiving sheet supply section 88 is loaded with a magazine 122 accommodating a roll of receiving sheet C. The receiving sheet C is delivered from the magazine 122 by means of a roller pair 110g and cut to a predetermined length with a cutter 124 provided ahead of the roller pair 110g. A predetermined length of the receiving sheet C is transported to the superimposing section 90 by a roller pair 110h.

Ahead of the superimposing section 90 is provided the thermal development/transfer section 92 that heats the recording material A superimposed on the receiving sheet C so as to develop the latent image on the recording material A and transfer the developed image onto the receiving sheet C.

The thermal development/transfer section 92 is enclosed with a heat-insulating partition wall 126 and includes a hollow cylindrical heating drum 130 containing a halogen lamp 128 and an endless belt 136 that is wound onto the drum 130 through an angle of about 270 degrees and that is supported by four belt support rollers 132, 133, 134 and 135. The section 92 heats the recording material A in superposition on the receiving sheet C, whereupon the latent image on the recording material A is developed and transferred onto the receiving sheet C to produce colors.

The detacking section 94 is also contained in the space defined by the partition wall 126 and it comprises a first detacking finger 138 for separating the recording material A from the receiving sheet C, a second detacking finger 140 for separating the receiving sheet C from the heating drum 130, and a roller 142 that helps discharge the receiving sheet C to the outside of the partition wall 126.

Provided ahead of the thermal development/transfer section 92 on one side are a disposal tray 144 into which the recording material A that has been separated from the receiving sheet C by means of the first detacking finger 138 is dumped and a roller pair 110i that assists in the dumping of the waste recording material A into the tray 144. Also provided ahead of the thermal development/transfer section 92 but on the other side are a receiving tray 146 in which receiving sheets C are to be stacked, and roller pairs 110j, 110k and 110l that transport the receiving sheet C into the tray 146 after the developed image has been transferred thereonto.

The image recording apparatus of the present invention has been described above with reference to a representative case in which it is applied to a copier that uses the recording material A of a type that is heated to develop and transfer and image onto a receiving material having an image receiving layer in the presence of an image forming solvent such as water. It should, however, be understood that the color image recording apparatus of the present invention is also applicable to other forms of image forming apparatus such as copiers and printers that use similar types of recording material A, electrophotography and silver halide photographic materials. The color image recording apparatus of the present invention may also be applied to various kinds of display devices with advantage.

While the color image recording apparatus of the present invention has the construction described on the foregoing pages, it should of course be understood that the present invention is in no way limited to the particular embodiments described herein and that various improvements and design alterations are possible without departing from the spirit and scope of the invention.

Having the construction described above, the color image recording apparatus of the present invention offers the advantage of obviating reflecting and dichroic mirrors that have been used to align the optical axes of R, G and B laser beams in conventional color image recording apparatuses. Further, the special optical modulators such as AOMs and the associated control circuits that are incorporated in conventional color image recording apparatuses that employ a white light emitting laser are not necessary and this also contributes to the fabrication of a compact and inexpensive color image recording apparatus.

The use of a single laser light source offers the added advantage of obviating the adjustments of the optical axes of laser beams associated with exposure to R, G and B light which have been necessary in the conventional color image recording apparatus, thereby providing great ease in the procedure of adjusting the optical system.

In a preferred embodiment, the RGB laser described in commonly assigned Japanese Laid-open Patent Application No. 44,433/1989 which is capable of simultaneous emission and wavelength conversion of laser beams of three primary colors is used in the color image recording apparatus of the present invention. Since this permits the use of inexpensive and compact semiconductors as an emission source of fundamental waves, the cost and size of the overall equipment can be reduced. Despite the use of semiconductor lasers, the apparatus of the present invention can be used with common recording materials having a spectral sensitivity in the visible wavelength range even if SHG or other wavelength converting means are not adopted. Because of these advantages, the apparatus of the present invention can be operated at a lower running cost.

What is claimed is:

1. A color image recording apparatus for recording a full color image by sequentially defining different scanning lines respectively corresponding to three primary colors on a material to be recorded by means of a laser beam deflected in a scanning direction, wherein the apparatus includes:
    a laser light source capable of simultaneous emission of laser beams associated with exposure to red, green and blue light,
    a light deflector for said laser beams having at least one reflecting face, and
    means for selectively reflecting said laser beams, which changes the spectral characteristics of reflection of said laser beams in a sequential cycle defining scanning lines corresponding to the three primary colors, in order to choose the color to be recorded on the material.

2. The color image recording apparatus according to claim 1, wherein said light deflector is a rotating polygonal mirror having a plurality of reflecting faces wherein said at least one reflecting face has spectral characteristics different from other said reflecting faces, and said means for selectively reflecting the laser beam is said at least one reflecting face of said rotating polygonal mirror.

3. The color image recording apparatus according to claim 1, or 2, wherein said at least one reflecting face has a different spectral reflectance for one of said three primary colors.

4. The color image recording apparatus according to claim 1 or 2 wherein said laser light source is an RGB laser which emits three primary color laser beams by wavelength conversion.

5. The color image recording apparatus according to claim 1, wherein said means for selectively transmitting the laser beam is a color filter assembly which moves synchronically with said light deflector, said color filter assembly having a plurality of transmitting faces wherein at least one of the transmitting faces has transmitting characteristics different from other transmitting faces.

6. The color image recording apparatus according to claim 5 wherein said transmitting face having transmitting characteristics different from other transmitting faces has a different transmittance for one of said three primary colors from the other two of said three primary colors.

7. The color image recording apparatus according to claim 5 wherein said laser light source is an RGB laser which emits three primary color laser beams by wavelength conversion.

8. The color image recording apparatus according to claim 5 wherein said light deflector is a rotating polygonal mirror and said color filter assembly is a color filter ring.

9. The color image recording apparatus according to claim 5 wherein said color filter assembly is a color filter disk.

10. A color image recording apparatus for recording a full color image by sequentially defining different scanning lines respectively corresponding to three primary colors on a material to be recorded by means of a laser beam deflected in a scanning direction, wherein the apparatus comprises:

a laser light source capable of simultaneous emission of laser beams associated with exposure to red, green and blue light;

a light deflector for said laser beams having at least one reflecting face; and means for selectively transmitting said laser beams, which changes the spectral characteristics of transmission of said laser beams in a sequential cycle defining scanning lines corresponding to the three primary colors, in order to choose the color to be recorded on the material.

* * * * *